United States Patent [19]
Hekmatpour et al.

[11] Patent Number: 5,982,350
[45] Date of Patent: Nov. 9, 1999

[54] COMPOSITER INTERFACE FOR ARRANGING THE COMPONENTS OF SPECIAL EFFECTS FOR A MOTION PICTURE PRODUCTION

[75] Inventors: Sharam Hekmatpour, Wollongong; David A. Hodson, Heidelberg; David J. Mann, Dallas, all of Australia

[73] Assignee: Eastman Kodak Company, Rochester, N.Y.

[21] Appl. No.: 08/126,450

[22] Filed: Sep. 24, 1993

Related U.S. Application Data

[63] Continuation of application No. 08/773,372, Oct. 7, 1991, abandoned.

[51] Int. Cl.$^6$ .................................................. G09G 5/00
[52] U.S. Cl. .......................... 345/113; 345/114; 348/586
[58] Field of Search .................................. 352/85, 86, 97, 352/129; 345/113, 114, 118, 120; 348/586, 588, 597

[56] References Cited

U.S. PATENT DOCUMENTS

| | | |
|---|---|---|
| 3,006,993 | 10/1961 | Barndt ..................................... 358/183 |
| 3,595,987 | 7/1971 | Vlahos . |
| 3,749,822 | 7/1973 | Van der Veer et al. . |
| 4,266,242 | 5/1981 | McCoy . |
| 4,498,079 | 2/1985 | Ghosh et al. ............................ 345/114 |
| 4,538,188 | 8/1985 | Barker et al. . |
| 4,602,286 | 7/1986 | Kellar et al. . |
| 4,612,569 | 9/1986 | Ichinose . |
| 4,713,695 | 12/1987 | Macheboeuf . |
| 4,746,994 | 5/1988 | Ettlinger . |
| 4,857,994 | 8/1989 | Belmares-Sarabia et al. . |
| 4,876,600 | 10/1989 | Pietzsch et al. . |
| 4,952,051 | 8/1990 | Lovell et al. .............................. 352/87 |
| 5,008,755 | 4/1991 | Brain . |

OTHER PUBLICATIONS

SMPTE Journal, Mar. 1991, paper entitled High Resolution Electronic Intermediate System for Motion Picture Film, by B. Hunt, G. Kennel, L. Demarsh and S. Kristy.

SMPTE Presentation Oct. 16, 1990, entitled Development of High Resolution Electronic Intermediate System, by G. Kennal and M. Inchalik.

"ConMan A visual programming language for Interactive Graphics", Computer Graphics, vol. 22, No. 4, Aug. 1988, pp. 103–108.

IEEE Spectrum, vol. 20, No. 2, Feb. 1983, New York, USA, pp. 44–51, Kellogg S. Booth et al., "Computers animate films and video".

C. Williams and J. Rasure, "A Visual Language for Image Processing", IEEE Workshop on Visual Languages, Skokie, IL, Oct. 1990, pp. 86–91.

T. Sauer, J. Rasure and C. Gage, "Near Ground Level Sensing for Spatial Analysis of Vegetation", IAPR TC7 IEEE Conference, Maryland, Jun. 14, 1990, pp. 11–26.

J. Rasure, D. Argiro, T. Sauer and C. Williams, "A Visual Language and Software Development Environment for Image Processing", International Journal of Imaging Systems and Technology, vol. 2, pp. 183–199 (1990).

*Primary Examiner*—Amare Mengistu
*Attorney, Agent, or Firm*—Francis H. Boos, Jr.

[57] ABSTRACT

A user interface is described for an image computing workstation for electronically arranging the components of a special effects job, such as image-compositing, from a plurality of image sequences obtained by the scanning of motion picture film. The interface controls the ordering of a plurality of image sequences into a hierarchy of background and foreground image sequences, with each sequence being composed of frames whose appearance imitates the frames of a motion picture film. The hierarchical image sequences are displayed adjacent to each other in a windowing environment so that the frames thereof visually align on a frame-to-frame basis. The interface includes means for varying the hierarchical order and the adjacency of the image sequences so that different frames thereof are brought into visual alignment with each other, whereby the image sequences are correctly ordered as to hierarchy and adjacency for a special effect. As an additional feature, the interface provides a flow diagram for specifying the type and order of special effect operations applied to each frame.

14 Claims, 11 Drawing Sheets

COMPOSITER INTERFACE FOR ARRANGING THE COMPONENTS OF SPECIAL EFFECTS FOR A MOTION PICTURE PRODUCTION

This is a continuation of application Ser. No. 08/773,372, filed Oct. 7, 1991 now abandoned.

TECHNICAL FIELD

This invention relates to the field of motion picture production and, in particular, to the production of motion picture special effects.

DESCRIPTION RELATIVE TO THE PRIOR ART

Figure 1:
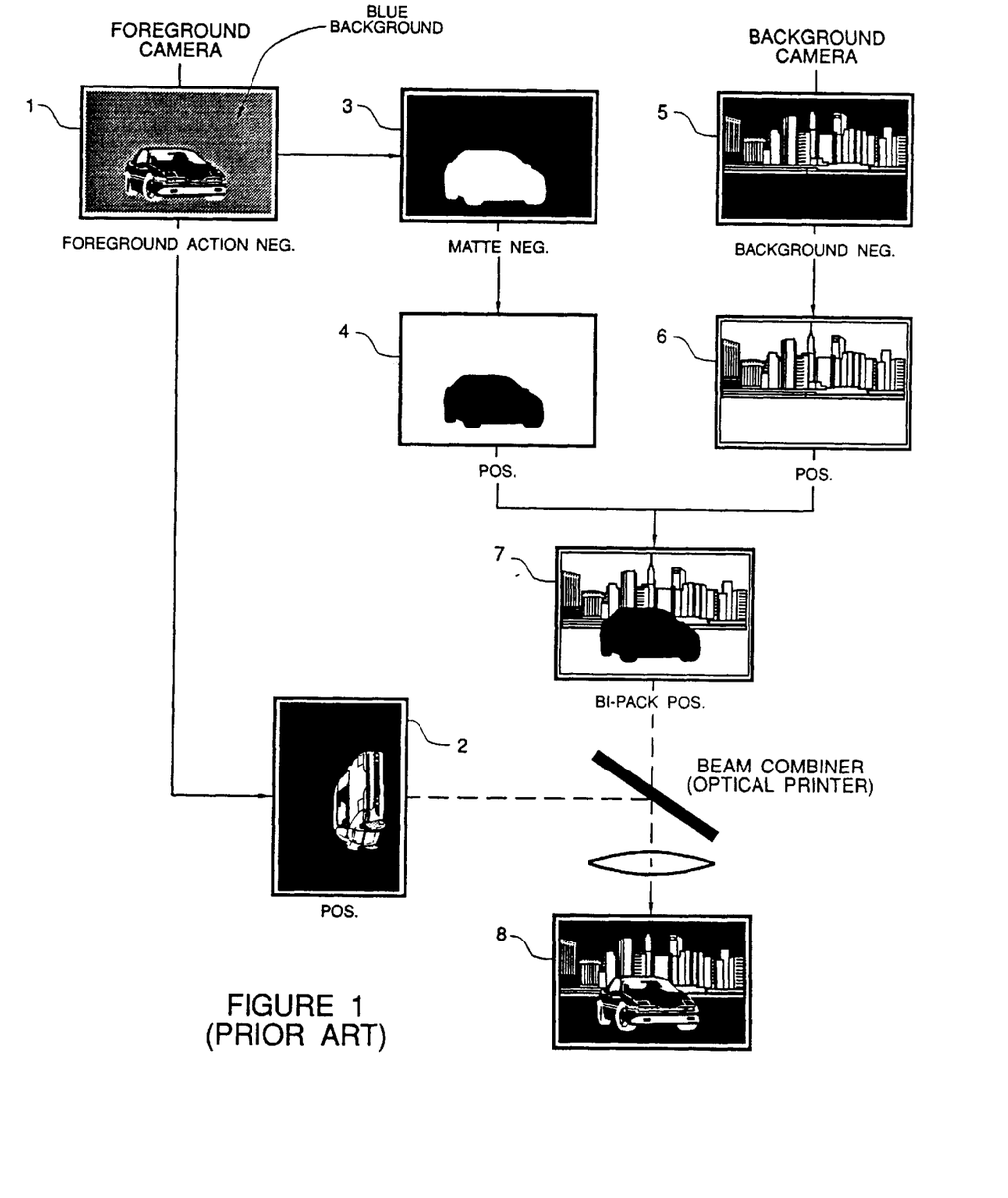
FIG. 1 is a schematic illustration of a special effect known as image compositing as practiced in the optical arts.

Special effects play an important role in the story telling process of theatrical motion-picture films. The use of special effects has increased rapidly with the advances made by leading companies and individuals in the field. An example of a special effect called compositing is shown in FIG. 1. A foreground camera produces a foreground color negative 1 of a foreground scene usually shot against a deep-blue backing. In a laboratory process involving color separations, a foreground positive 2 and a high contrast hold-back matte 3 are extracted from the foreground color negative 1. A black-center matte 4 (positive) is then printed from the hold-back matte 3. Meanwhile a background camera produces a background negative 5, and from that a background positive 6 is made. The black-center matte 4 and the background positive 6 are bi-pack printed to form a bi-pack positive 7, which is a background image with an opaque silhouette exactly matching the foreground subject. The final composite negative 8 is obtained by optically printing the foreground positive 2 and the bi-pack positive 7, which exactly emplaces the foreground object into the opaque area in the bi-pack positive. As may be appreciated, this technique is done on a large number of motion picture images constituting a motion picture scene; due to its temporal dimension, this is sometimes referred to as the travelling matte process. Historically, such effects have been produced by traditional optical printing methods, which tend to be very time-consuming and costly because of the number of laboratory and optical printing stages required.

The animation industry has experimented with electronic compositing procedures that can foreshorten some of the time lag due to optical effects. For instance, in U.S. Pat. No. 3,749,822, an analog animation system is disclosed in which stock foreground and background film scenes are scanned, electronically superimposed, and reconverted to an optical image on a cathode ray tube that is photographed by a motion picture camera. This is, however, a relatively low definition system of limited manipulation capability that is not suitable for the standards of today. Elaborate interfaces have subsequently been disclosed (see U.S. Pat. No. 4,952,051) for handling and editing of drawings created in sequence, especially for animation, with the use of electronic graphics equipment. Electronic blue-screen matting using complex analog color difference algorithms (see U.S. Pat. No. 3,595,987) have been proposed for motion picture applications, but have largely been relegated to video processing because of process limitations.

The video post production industry utilizes electronic compositing techniques based on digital technology in order to alleviate some of the problems present in analog video resolution systems. For example, in U.S. Pat. No. 4,266,242, a hardware-intensive video special effects generator is described in which input video signals are positioned at any location, thus varying size and position in a composite output image, by manipulating storage addresses in a memory. Special effects disclosed include compressing in horizontal and vertical dimensions, x-y translation, and display according to a priority sequence (i.e., of one portion of one input image in the composite output image to the exclusion of other video input images). Further representative video special effects disclosures include U.S. Pat. No. 4,602,286 (a digital compositer wherein one image is keyed into another image by utilizing plural frame stores), U.S. Pat. No. 4,713,695 (image superposition obtained without exceeding standard television peak-to-peak picture signal amplitudes), U.S. Pat. No. 4,876,600 (a composite image is composed from cameras, raster graphic generator, and mass storages), and U.S. Pat. No. 5,008,755 (combined mix/wipe and size/position transition effects are controlled from a common memory to cooperate on a "common time line").

Figure 2:
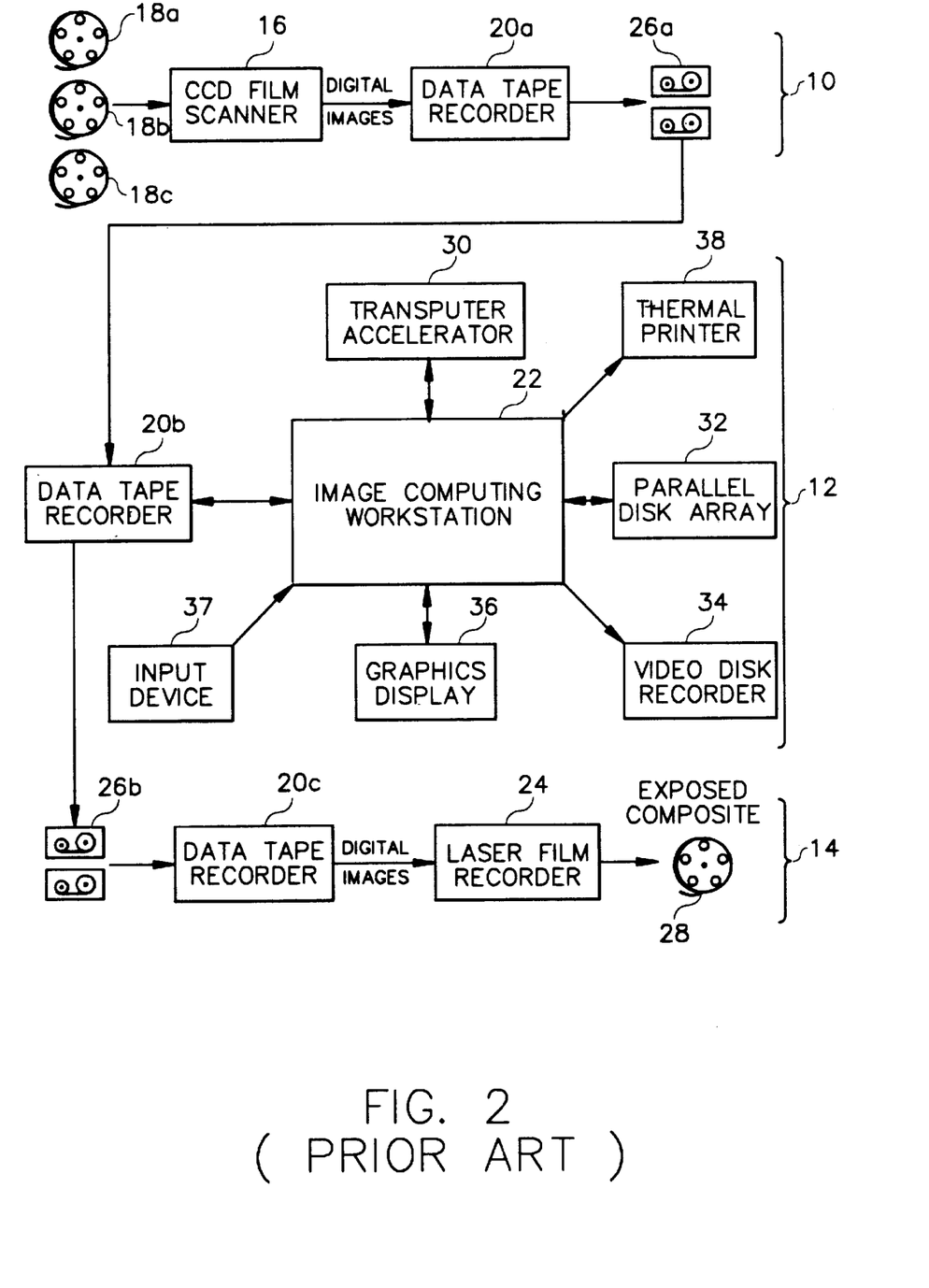
FIG. 2 is a block diagram of a high resolution electronic intermediate system for motion picture film, as described in the prior art.

Within the motion picture industry, high definition television equipment is being considered for electronic creation of special film effects. The high definition format, however, has lower spatial resolution, incompatible frame rate, limited contrast range, different colorimetry, and an interlaced line structure as compared to film. There is a need, therefore, for a higher-quality system to serve as a bridge for motion-picture film images to move into the high-resolution digital domain for subsequent image manipulation, and then back onto film for distribution and theatrical display. Such a system was proposed at the 131st Technical Conference of the Society of Motion Picture and Television Engineers on Oct. 24, 1989 in a paper entitled "High Resolution Electronic Intermediate System for Motion Picture Film" (by B. Hunt, G. Kennel, L. DeMarsh, and S. Kristy), and subsequently published in the *SMPTE Journal,* March 1991, pp. 156–161. This paper proposes both a high-resolution electronic intermediate system and the establishment of a digital image standard for motion-picture film. This system and standard would provide an interactive tool to manipulate digitized motion-picture film images. It would operate "transparently" between film input and film output, with no visible image-quality compromises in between. FIG. 2 is a block diagram of the basic components of such a high-resolution intermediate system, separated into three operational stages: a film input scanning stage 10, an image manipulation stage 12, and a film output recording stage 14. The basic components of these stages include a high resolution film scanner 16 for scanning input special effects elements (films) 18a, 18b, 18c; a plurality of digital data recorders 20a, 20b, 20c used in the various stages; an image computing workstation 22; and a high resolution film recorder 24 for outputting back to film. The operational stages are linked by digital tape recordings 26a, 26b; the final output is an exposed composite film strip 28.

The film scanner 16 disclosed in the Hunt et al article is a high-resolution charge-coupled device (CCD) film scanner using a trilinear color sensor array with about 4000 photosites for fully capturing three color records from the film. The parameters and system specifications were further described in an unpublished presentation entitled "Development of the High Resolution Electronic Intermediate System", which was given by G. Kennel and M. Inchalik to an SMPTE Technical Conference on Oct. 16, 1990. The operational speed of the scanner 16 would be about 3 seconds per frame for Academy aperture film (2 seconds for scanning and recording and 1 second for frame advance and registration), and the resulting signals would be digitized, in density space, to 10 bits/color. The film recorder 24 is a high-resolution laser film recorder using three visible light, gas lasers (458 nm Argon, 543 nm Helium Neon, and 633 nm Helium Neon lasers) for recording the output image on Eastman Color Intermediate film, thereby generating the exposed composite film 28.

The image computing workstation 22 consists of a conventional computer workstation based on a SUN platform with VME backplane and a UNIX operating system. A transputer-based image processing accelerator 30 provides high-speed image manipulation, a parallel disk array 32 provides a large image memory, a video disk recorder 34 provides the capability to make a "video workprint", and a high resolution graphics display 36 provides visual interface with the operator. Hard copy output is provided by a high resolution thermal printer 38. Besides image compositing, the workstation allows a variety of image manipulation capabilities, including color grading of each scene or individual elements in a scene; the combination of computer-generated images with film images; "painting" to selectively modify portions of an image or to eliminate artifacts like dirt, scratches, or guide wires; digital special effects such as "page turns" ; and titling that is generated "word-processor style" and then combined with any scene in a variety of different on-line font styles and colors.

Achievement of these capabilities for the workstation 22 requires careful design, not only to ensure that the workstation hardware has the necessary performance to handle the high resolution images, but also to ensure that the ergonomic and workflow concepts are correct. In connection with the latter, one of the characteristics of successful film optical houses is their use of a formal and planned environment. Their management structure provides for effective use of expensive resources, reduces waste and rework and ensures short cycle times. The use of careful planning and efficient workflow management should ideally be preserved with the introduction of digital technology via the image computing workstation 22. In particular, the workstation should be designed to be easy for film optical technologists to learn to use. By designing the workstation to use familiar concepts and processes the learning curve can be made easier to negotiate. For these reasons, though digital technology may be poised to revolutionize the motion picture industry, the ergonomics of the workstation (i.e., the user interface) should conform to most of the processes and terminology familiar to the film optical world.

The video post production industry has long been involved in electronic editing of video signals, that is, the sequential joining of separate scenes into a whole program. The ergonomics of the video editor, however, is aimed toward a kind of "user-friendliness" that has application to program assembly. In U.S. Pat. No. 4,612,569, for instance, a plurality of frames from plural input television sources are displayed on a monitor as if looking at a plurality of "cinefilms" arranged side-by-side. The "films" are moved forwardly or backwardly at any desired speed to determine the editing points. In addition, some video editors (see U.S. Pat. Nos. 4,538,188 and 4,685,003) provide a storyboard output including a sequence of pictorial labels, designating the serially connected scenes, which describe the flow of the story. Unfortunately, such editing techniques are designed to emulate end-to-end "splicing" and are not useful in characterizing the "parallel" relationships, e.g., of coincident foreground and background scenes, that must be properly visualized to obtain a special effect.

SUMMARY OF THE INVENTION

An object of the invention is to provide means to interactively manipulate digitized motion picture images arranged in a "parallel", or cross-over, hierarchy.

A further object is to produce a system that could be easily used by film-effects specialists and yet provide a rich and full-featured environment for the creation of high resolution digital effects.

A further object is to model film optical processes by incorporating several formalities into the workstation user interface: first, to manage the images with terminology and symbology familiar to the film effects editor; secondly, to line up the images to visually define the special effects task; and thirdly, to graphically chart the type and order of operations applied to each frame.

A further object is to incorporate the visual definition of the special effects task and the graphical charting of the type and order of operations into respective windows that provide virtually all of the functionality required to create digital visual effects.

An automated interface has been developed for the visual representation and direct manipulation of the components that constitute a special effects job. Each component consists of a sequence of frames (images) that mimic the appearance of a film strip. The compositer user interface displays miniature images within the constituent frames as accurate representations of the actual images. The user can manipulate the components using mouse and keyboard operations, which include: changing the fit or timing of a component; changing the position of a component in the hierarchy; deleting, duplicating, cutting, copying, or pasting of components as well as frames; re-arranging the order of the frames in a component; changing the speed of a component; and saving a job's configuration at any stage for future re-use.

There are at least three major benefits in this approach over using optical techniques. Firstly, since the user works with digital images instead of film, manipulation operations are simplified and do not require making physical changes to the original medium. For example, the virtual "cutting" and re-arranging of frames in a film strip happen in software and are therefore easily reversible. Secondly, delays that are unavoidable in the optical domain (e.g., sending a composite film roll to a lab for overnight printing) disappear altogether. The user can see the effect of the operations on the screen in a matter of a few seconds. This enables the user to be much more productive and to achieve better results by going through more cycles than achievable in the optical domain. Finally, jobs are maintained in a compact and self-contained form, enabling the user to treat them as objects that can be readily stored, edited, and duplicated. For example, to create multiple versions of a job, the user can make duplicates of the job file and make changes to them as necessary, leaving all the digital images intact.

Accordingly, the invention pertains to a system for electronically arranging the components of a special effects job for a motion picture production from a plurality of image sequences obtained by the scanning of motion picture film. The system includes the ordering of a plurality of image sequences into a hierarchy of background and foreground image sequences, with each sequence being composed of frames whose appearance imitates the frames of a motion picture film. The hierarchical image sequences are displayed adjacent to each other so that the frames thereof visually align on a frame-to-frame basis. The system includes means for varying the hierarchical order and the adjacency of the image sequences so that different frames thereof are brought into visual alignment with each other, whereby the image sequences are correctly ordered as to hierarchy and adjacency for a special effect. As an additional feature, the system specifies the type and order of special effects operations applied to each frame by means of a flow diagram showing the order of the special effects.

BRIEF DESCRIPTION OF THE DRAWINGS

The prior art and the invention will be described in relation to the drawings, in which.

DETAILED DESCRIPTION OF THE INVENTION

Inasmuch as an electronic intermediate system has been disclosed in the prior art heretofore cited, the present description will be directed in particular to elements forming part of, or cooperating more directly with, an interface system in accordance with the present invention. Elements not specifically shown or described herein may be selected from those known in the art. In particular, the algorithms for special effects, which are not themselves parts of the invention, are not specifically described herein and may be selected from well-known disclosures in the prior art. For instance, algorithms bearing on the actual process of electronic compositing are described in such patents as U.S. Pat. Nos. 3,595,987; 4,007,487; 4,100,569; and 4,344,085; all in the name of Petro Vlahos, the teachings of which are incorporated by reference herein.

Figure 3:
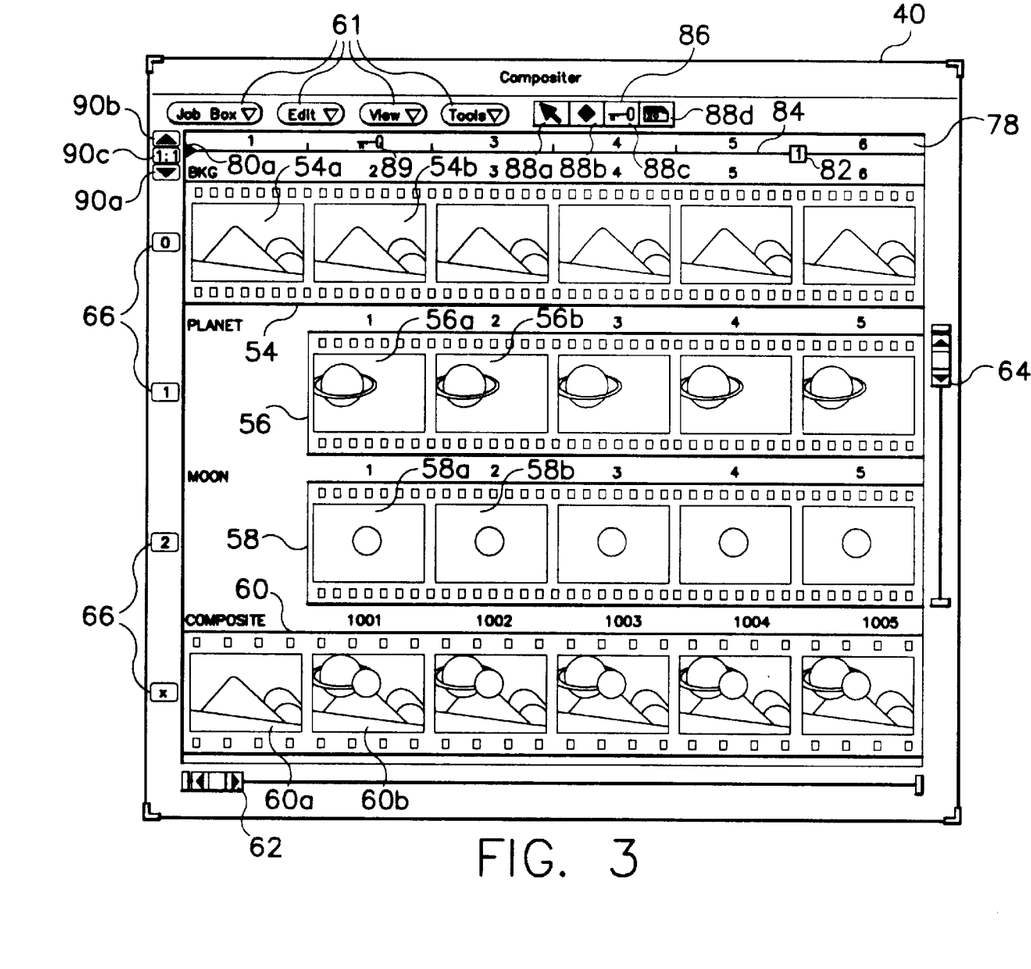
FIG. 3 is a diagram of the compositer window component of a user interface as specified in accordance with the invention for use with the intermediate system of FIG. 2.
Figure 4:
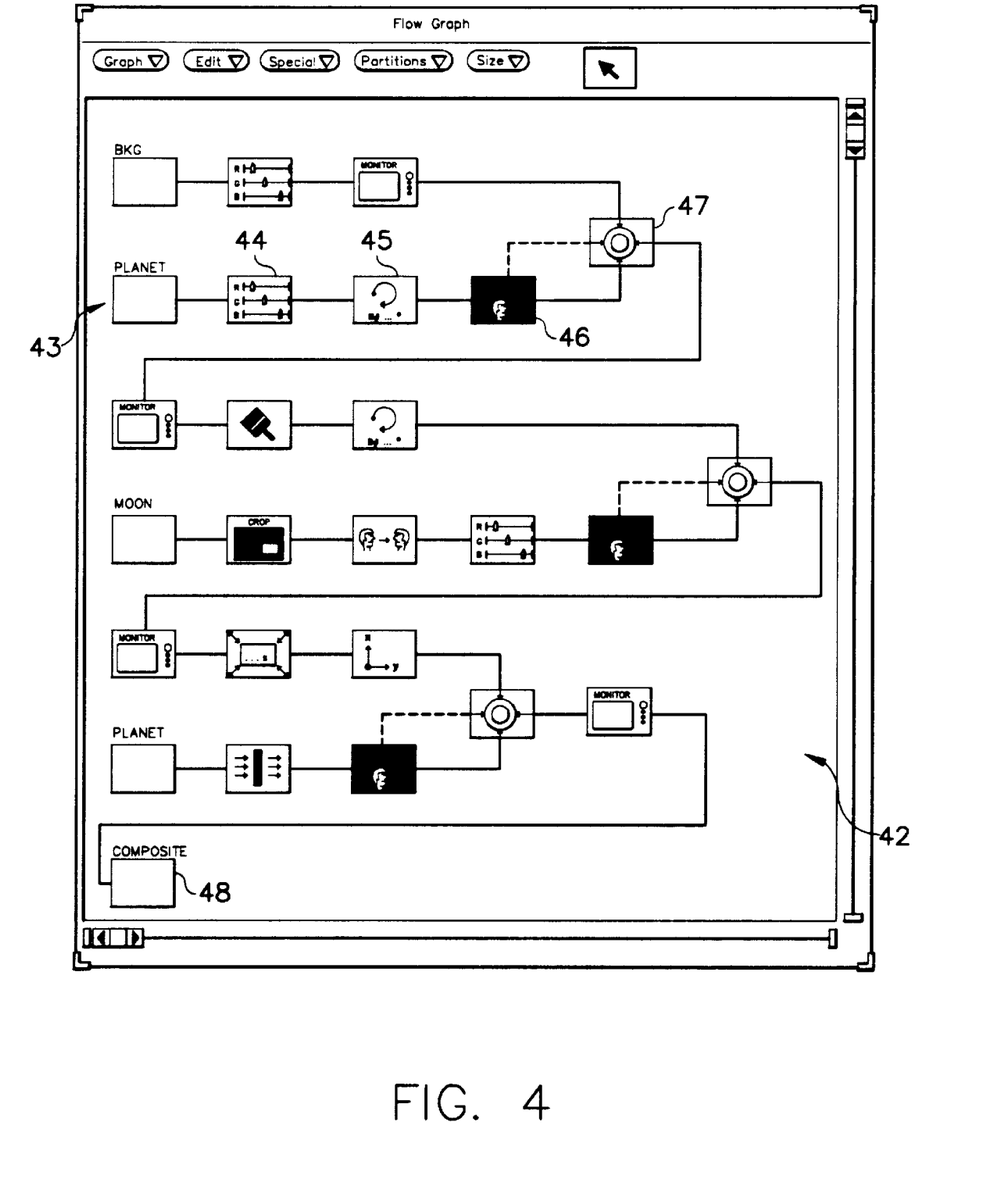
FIG. 4 is a diagram of the flow graph component of the user interface as specified according to the invention for use with the intermediate system of FIG. 2.
Figure 5:
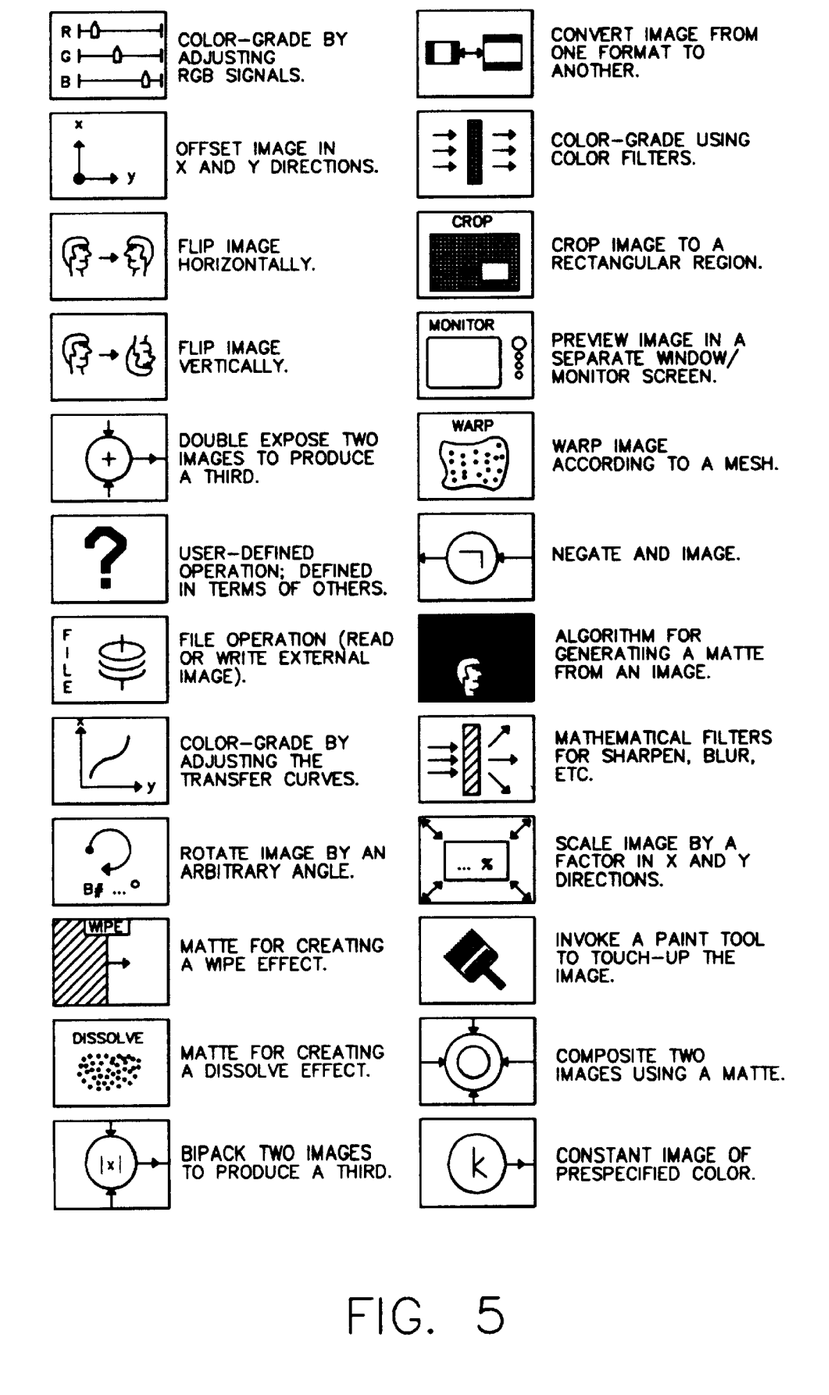
FIG. 5 explains the symbols available for the flow graph of FIG. 4.

The invention is characterized by the line up process illustrated by the compositer window 40 in FIG. 3 and the flow graph structure 42 illustrated in FIG. 4 (FIG. 5 defines the symbols involved in the flow graph 42 of FIG. 4). The compositer window 40 and the flow graph structure 42 appear as rectangular, on-screen frames shown by the graphics display 36 (see FIG. 2) and through which a user can view the progress of a special effects job. These frames are run in a conventional windowing environment, that is, an applications program interface commonly associated with a graphical user interface (such as windows, pull down menus, scroll bars or scroll boxes, and so on). The manipulating of the information within the compositer window 40 and the flow graph structure 42 is controlled by a user who interacts with the image computing workstation 22 (see FIG. 2) in real-time through an input device 37 such as a mouse, stylus, or keyboard. The compositer window 40 and the flow graph structure 42 represent a software controlled user interface that presents the end-user (typically an optical technician) with tools and concepts that a person of such skills would feel comfortable with.

The compositer window 40 is the component of the user interface that enables the user to line-up and manipulate the components of a special effects job using simple and intuitive mouse (or stylus) and keyboard operations. The components of the special effects job are obtained by scanning specially prepared filmstrips of backgrounds and foregrounds (using CCD film scanner 16, FIG. 2), by accessing previously stored scenes, or by generating scene elements with the image computing workstation 22. In the line-up process, the compositer window 40 acts as a virtual light box to allow the structure of an effects job to be quickly defined. The window 40 (light box) displays components as film strips that can be moved around freely to establish the horizontal fit and vertical cross-over hierarchy. Referring to FIG. 3, four image sequences (hereinafter referred to as elements) are displayed in the compositer window 40: a background element 54, a first foreground element 56, a second foreground element 58, and a composite element 60. Each element 54, 56, 58, 60 consists of a sequence of frames (54a, 54b . . . ; 56a, 56b . . . ; 58a, 58b . . . ; 60a, 60b . . . ). Depending on the original scanned film, the frame representation on the screen mimics either Vistavision (8 sprocket holes on either side of each frame) or Academy (4 sprocket holes on either side of each frame). In either case, the aspect ratio is 1.5 and the frames run horizontally. Each frame is displayed as a low resolution "postage-stamp" image in its film strip. This is, for example, a 64×96 pixel (24-bits RGB) image obtained by subsampling the original scanned image. Frame "postage stamp" images can be hidden if desired by invoking an appropriate menu selection (to be discussed later).

The other main component of the user interface is the flow-graph 42 (FIG. 4). The flow-graph controls the type and order of operations applied to each frame by specifying exactly what operations are to be performed and in what order they are applied to the elements of a job to produce the final composite. An initial configuration of the flow graph, showing a simple compositing operation, is constructed automatically by the system. Each operation is represented by an icon (called a node). The user can subsequently edit the flow-graph by adding nodes to the flow graph, deleting nodes, and changing the parameters associated with a node. FIG. 5 summarizes the operations and their associated icons. Additionally, the user may combine any set of these operations to produce more complicated operations. Defining further operations to be carried out for an effects job involves selecting an effects-process icon from the tool-kit of icons illustrated in FIG. 5. The tool-kit is provided in a pull-down list. Operating in the windows environment, the icon is selected from the toolkit and placed in the appropriate position within the flow-graph. This icon is then inserted into the list of operations to be performed by the workstation.

Each operation is accordingly represented by an icon (FIG. 5) and has an associated set of parameters. For instance, the second row 43 of icons in the flow graph 42 includes a color-grading icon 44 for adjusting the color of the input "planet" image, a rotation icon 45 for rotating the image, and a matting icon 46 for extracting the "planet"

image according to some predetermined algorithm. Each icon has an associated parameter, i.e., a color value for icon 44, a rotation angle for icon 45, and a matting algorithm for icon 46. After the processing in row 43, a compositing icon 47 specifies the combination of the "planet" image with the "background" image. In such manner the compositing operation continues until the final composite image 48 is obtained. The completed flow graph 42 represents an actual operation that can be electronically actuated upon a set of elements by appropriate menu selection (to be discussed).

All compositing-related activities are initiated from the window 40, which displays the constituent elements of a job. Each element is graphically represented as a strip of film: the top-most strip represents the background (BG) element 54, the bottom-most strip represents the composite sequence 60 and the intermediate strips represent the foreground (FG) elements 56, 58. The name of each element is left justified above each element. For example, in the window shown in FIG. 3, the BG element 54 is called BKG, and the first FG element is called PLANET. The second foreground element 58 is called MOON, and the composite sequence 60 is called COMPOSITE. Frame numbers for each element appear above it. These numbers are useful because not all elements run in sequential frame numbers (the frames may have been rearranged due to reversing or cutting and pasting). Both the element names and the frame numbers can be hidden if desired (refer to the View menu, which will be described later). Typically there is one background (BG) element 54 and one or more foreground (FG) elements 56, 58. The aim is to extract subjects of interest from the foreground elements and insert them into the background element, thereby giving the illusion that the foreground subjects were originally present in the background. As described earlier, this process is called compositing; it is usually carried out layer by layer, where during each pass the next foreground element is composited with the result of the previous pass (intermediate background). The optical technique illustrated in FIG. 1 is illustrative of one layer; FIG. 3 is illustrative of two layers. A three-layer process is illustrated by the example of the flow graph 42 in FIG. 4.

The hierarchical ordering of the elements and the start/stop position of each foreground relative to the background element is called the cross-over hierarchy. In particular, the priority of compositing will be determined by the cross-over hierarchy, that is, if FG element 58 is higher in the hierarchy (and therefore in priority) than the FG element 56, then the images being composited out of the FG element 58 will overlie and take precedence over (be "in front of") the images in the FG element 56 in the final composited image sequence 60. This is shown in FIG. 3 by the MOON Fg element 58 appearing in front of and obscuring the PLANET Fg element 56 in the COMPOSITE element 60.

Prior to compositing, though no part of the present invention, the elements are usually color-graded in order to achieve a mutually uniform color balance (this compensates for the different light conditions in which the elements were exposed and for the different film stock characteristics). The compositing process itself requires the production of mattes for foreground elements. These are gray-scale or bitonal images that are used to extract a foreground before compositing it with a background. Background, foreground, and matte images may have to go through other forms of processing before/after compositing. Examples include: geometric transformations (reposition, resize, scale, flip), sharpen, blur, and soft-edging of mattes. As mentioned before, the compositing algorithms are not part of this invention and may be found in such documents as the Vlahos patents previously mentioned. Likewise, suitable geometric transformations and the like are well known in the prior art.

In the optical world, all the elements for a special effects sequence, their production-related information (e.g., producer, director, roll numbers, dates), the cross-over hierarchy, the color-grading parameters, and all the other processes that the elements/mattes have to go through are stored in a box, called a job box. The job box, therefore, contains sufficient information for the special effects sequence to be regenerated at any future date. This concept is carried over into the present user interface, where a job box is an object that gathers information pertaining to a job. Accordingly, the compositer window 40 and the flow graph 42 present the user with a visual and structured view of the information in a job box, and provide functionality for manipulating the job box.

The compositer is invoked in a conventional manner by choosing the compositer command from a top level menu (not shown). This opens a blank compositer window 40. To nominate a job box to work on, the user drags a tool box file from a file manager window (not shown) and drops it into the compositer window 40, or alternatively specifies the job box using an open command. The elements of the special effects in the job box then appear in the compositer window 40.

The user interface permits many different operations to be applied to the various components of the job. Operations are applied by choosing commands from the pull-down menus shown in Table I, which are actuated by engaging the pull-down menu buttons 61 at the top of the compositer window 40. (The "job box" menu, which is not hereinafter described, provides commands for viewing the contents of the current job box, opening, closing, saving, reverting changes to a job box, and quitting the compositer window).

TABLE I

| PULL DOWN MENU | | |
| --- | --- | --- |
| EDIT | VIEW | TOOLS |
| undo | partitions | flow graph |
| cut | zoom | sequence preview |
| copy | ruler units | frame preview |
| paste | show | mini-movie |
| delete | | composite column |
| segment | | composite partition |
| select | | open loop composite |
| reverse | | paint |
| restore | | |
| printing | | |
| preferences | | |

The user interfaces with the menus by use of a three-button mouse represented by the input device 37 in FIG. 2. The buttons are called: SELECT (for selecting objects), ADJUST (for extending a selection), and MENU (for obtaining pop-up menus). Alternatively, a stylus can be used with a graphics tablet to support the same three functions. The mouse input is provided to a conventional graphics user interface with standard features including clipboard, desk accessories, scroll boxes, object dragging and so on.

Elements longer than the width of the window 40 can be scrolled horizontally using a scrollbar 62 at the bottom of the window 40. Because the elements 54, 56, 58, 60 are aligned together, horizontal scrolling affects all elements. (In effect, the horizontal scrollbar 62 is indicative of the position within the BG element 54, and the FG elements 56, 58 are aligned to the BG element.) Vertical scrolling(using a scrollbar 64 to the right of the window) affects FG elements 56, 58 only, and is useful when the job has more FG elements (more than the two shown in FIG. 3) than there is room for their simultaneous display. Horizontal and vertical scrolling are preferably both discrete, in the sense that it should not be possible to scroll by half a frame or half an element, as the compositing operation is based on frame-to-frame adjacency.

The window can be resized by dragging any of its four corners. Resizing may affect the number of frames displayed per element and/or the number of FG elements 56, 58 displayed within the window. Resizing is preferably discrete, so that half-frame, half-element, and large blank areas are avoided. Also a minimum window size of 3 elements by 3 frames, and a maximum window size (no greater than the screen size of the graphics display 36) are enforced to avoid meaningless displays.

Each element has an associated icon 66 positioned to its extreme left. The icon content indicates the position of the element in the cross-over hierarchy (0 for the BG element 54; 1, 2, etc., for the FG elements 56, 58; and |x| for the composite element 60). An element icon is selected by clicking SELECT on it, in which case it is highlighted. Only one element icon 66 can be selected at a time. An element is deselected by clicking ADJUST on it, or by clicking SELECT outside the element icons 66, or by selecting another element icon 66. An element can also be selected/deselected by clicking SELECT/ADJUST on its film base (i.e., any part of the film strip except where the images appear).

The following operations can be applied to the currently selected elements 54, 56, 58, or 60:

Choosing Delete from the Edit menu causes the element to be deleted from the job;

Choosing Cut from the Edit menu causes the element to be moved onto a "clipboard", i.e., a storage area where the element can be temporarily saved;

Choosing the Paste command on the Edit menu allows an element on the "clipboard" to be pasted before, over, or after another element;

Choosing Reverse from the Edit menu causes the order of the element's frames to be reversed;

Choosing Restore from the Edit menu causes all changes to the element to be restored;

Choosing Printing from the Edit menu displays a pop-up window (not shown) for setting the speed of the element (e.g., double printing or skip printing);

Choosing Mini Movie from the Tools menu displays a pop-up window (not shown) for previewing the element in real-time, using the low resolution images forming the virtual image frames in the compositer window 40; and Choosing Sequence Preview from the Tools menu displays a pop-up window (now shown) for previewing the element in real-time, using video resolution images.

Figure 6:
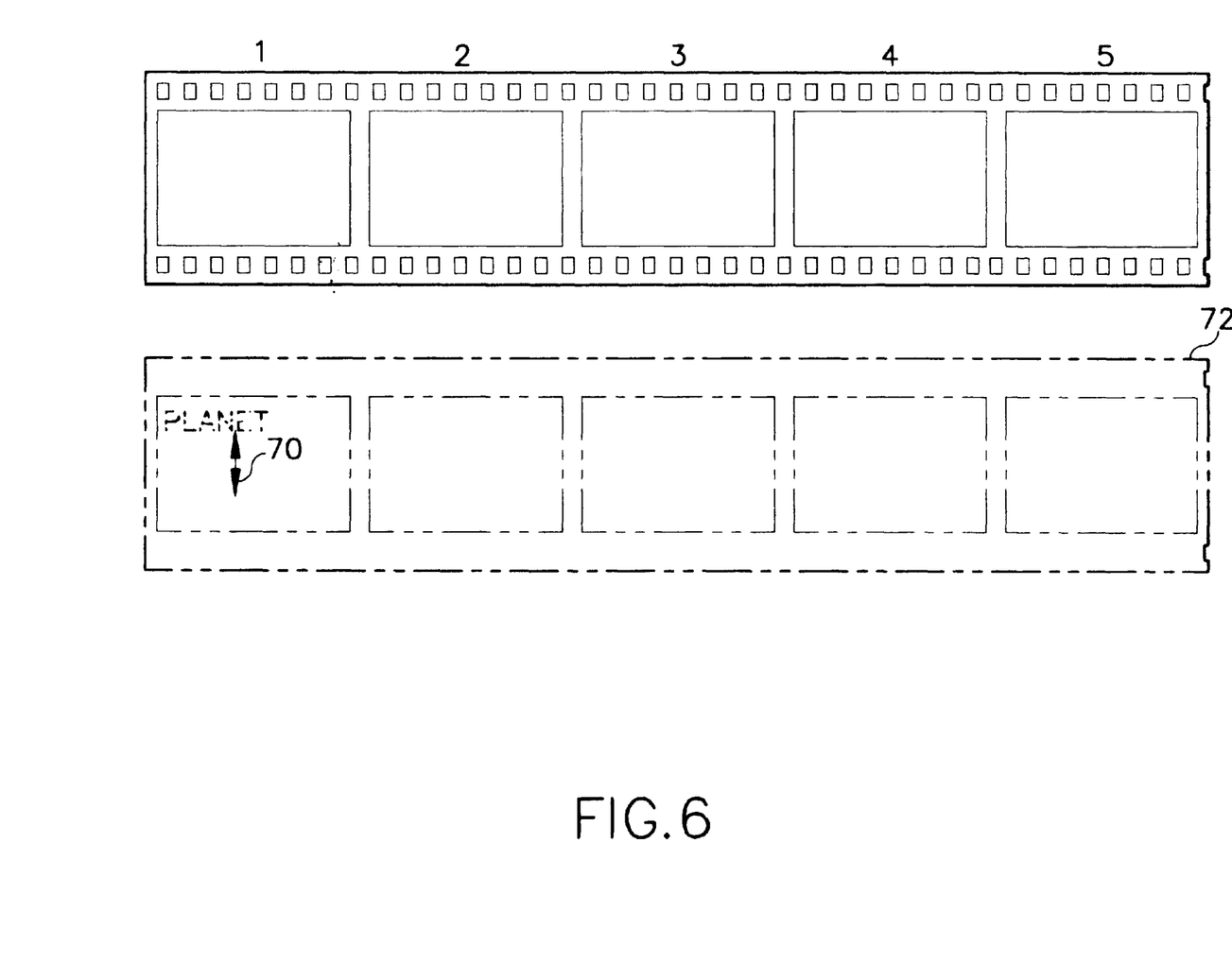
FIG. 6 is a diagram illustrating a vertical change in the hierarchy of the image sequences shown in FIG. 3.

As shown in FIG. 6, the position of an element in the hierarchy can be changed by vertically dragging its film strip (using SELECT) and dropping it on another element. The effect of this operation is that the two elements are swapped. When an element is dragged in this manner, the cursor changes to a bidirectional vertical arrow 70 and a ghost outline 72 of the element and its name follow the movement of the mouse as feedback to the user. This action changes the vertical component of the cross-over hierarchy. Dragging and dropping an element between two other elements, moves the element to between the two nominated layers. If the control key (on keyboard 37, FIG. 2) is held down while dragging, the operation is interpreted as a copy: the element is copied and the copy is inserted into the target layer. These operations can also be applied to element icons 66 to get exactly the same results. As a restriction, the composite element can neither be moved to another layer nor duplicated.

Figure 7:
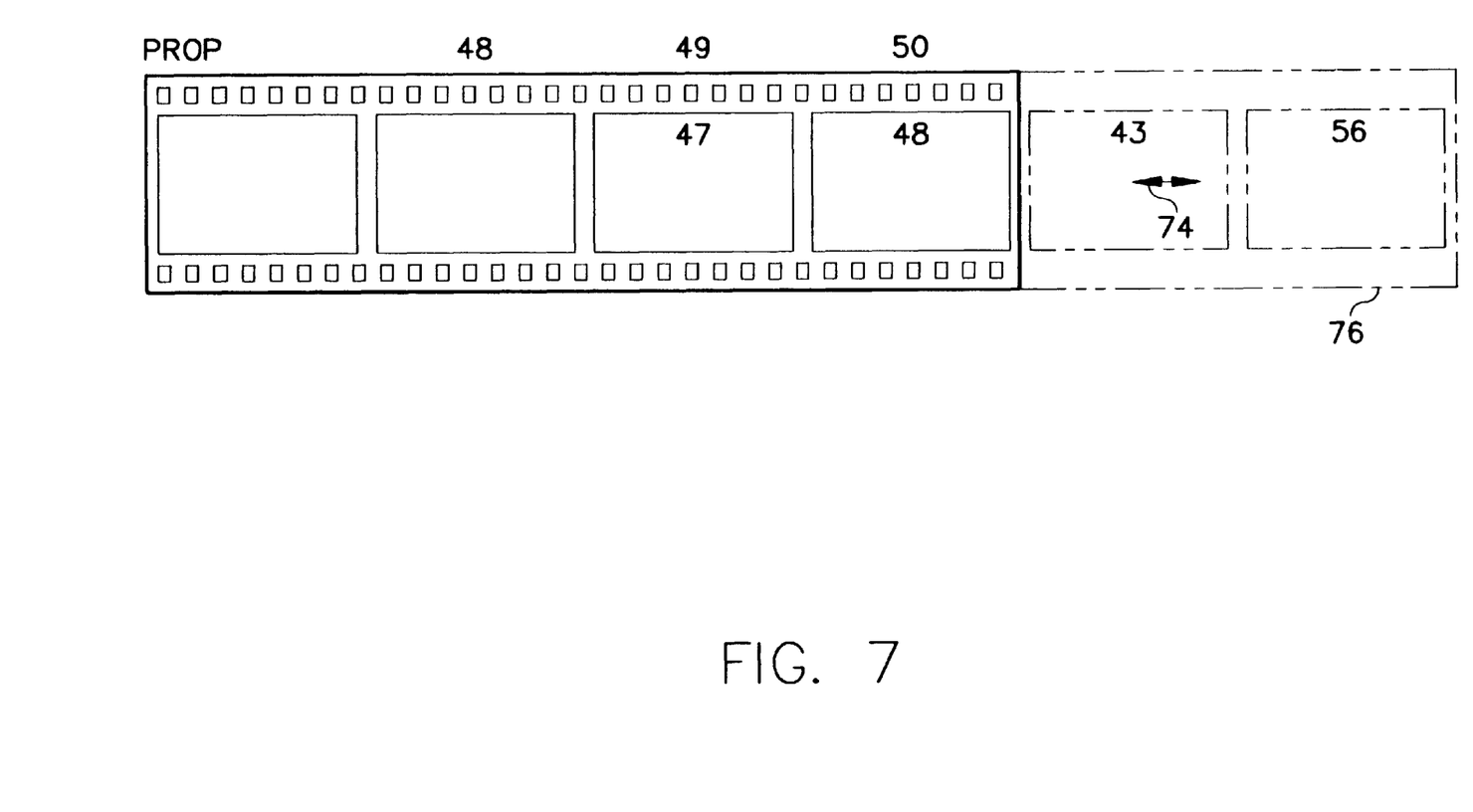
FIG. 7 is a diagram illustrating a horizontal change in the adjacency of the image sequences shown in FIG. 3.

As shown in FIG. 7, an element can also be dragged sideways to adjust its position (fit) in relation to other elements. This action changes the horizontal component of the cross-over hierarchy (also referred to as the adjacency of the elements). To do this, the user drags the film strip (using SELECT) left or right and drops it at the desired location. The element is then snapped to the new position so that its frames remain aligned with other elements' frames. As with vertical dragging of elements, the cursor changes to a bidirectional horizontal arrow 74 and a ghost outline 76 of the element follows the movement of the mouse. The frame numbers are also shown inside the ghost.

A frame is selected by clicking SELECT on the frame image area. Selected frames are then highlighted by a green box around the frame image. Multiple frames can be selected by clicking ADJUST on them. A selected frame can be deselected by clicking ADJUST on it. Clicking SELECT outside the frames deselects all currently selected frames. The following operations can be applied to the currently selected frames:

Choosing Delete from the Edit menu causes the frames to be deleted from the element;

Choosing Cut from the Edit menu causes the frames to be moved onto a clipboard;

Choosing the Paste command on the Edit menu allows the frames on the clipboard to be pasted to before, over, or after other frames;

Choosing Reverse from the Edit menu causes the order of the frames to be reversed;

Choosing Segment from the Edit menu causes the frames to be hidden or shown;

Choosing Frame Preview from the Tools menu displays a pop-up window (not shown) for previewing the selected frame in its original resolution; and Choosing Paint from the Tools menu invokes a paint tool for touching up the original image for the selected frame.

Figure 8:
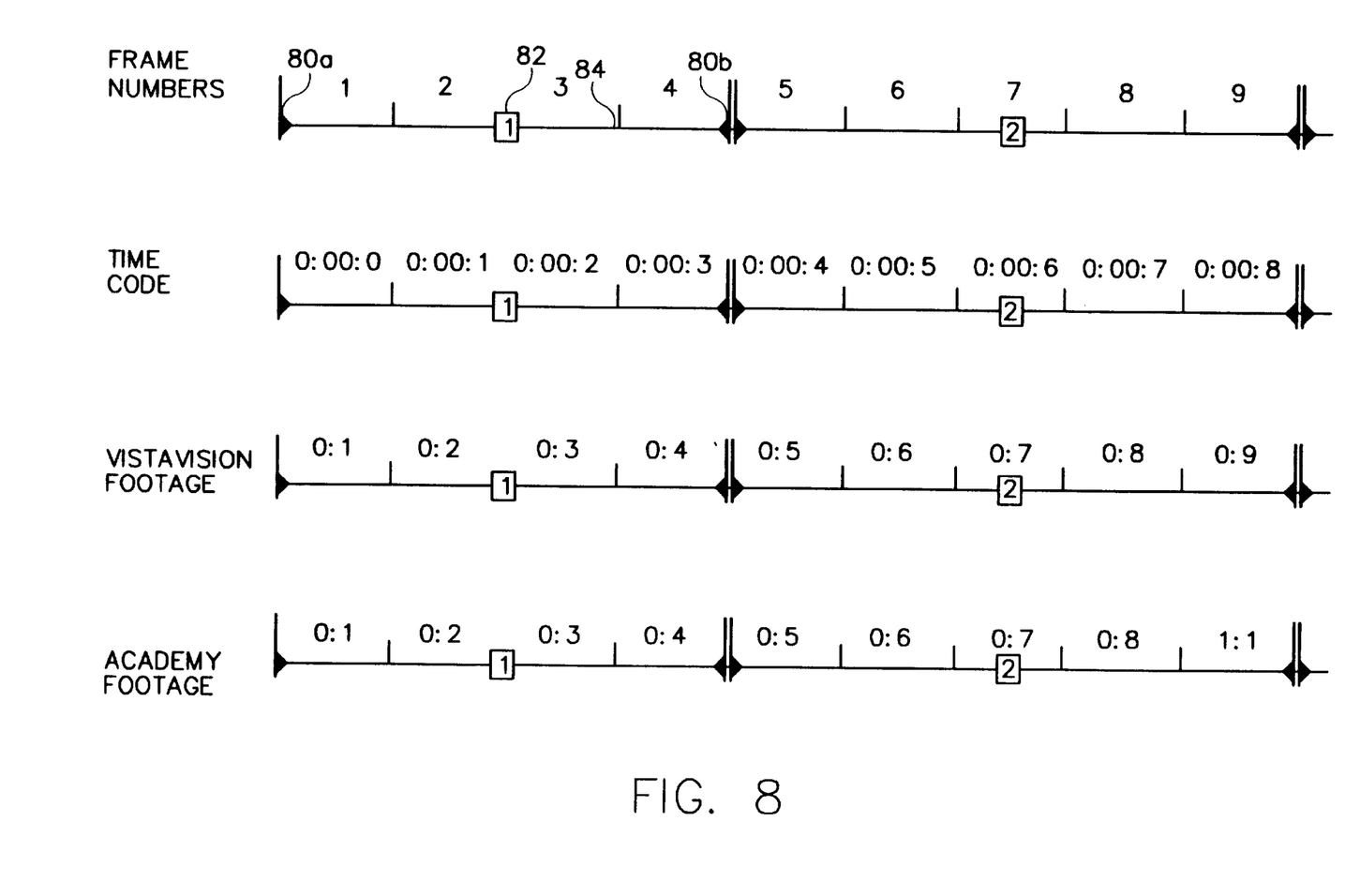
FIG. 8 is a diagram showing several ruler selections for the compositer window shown in FIG. 3.

As shown in FIG. 3, a ruler 78 permanently appears above the elements 54, 56, 58, 60 and contains the frame numbers 1, 2, 3, . . . for the entire job (starting from 1). As the user scrolls horizontally through the elements of a job, the ruler scrolls with the elements. The default unit for the ruler 78 is the frame numbers. This can be changed to time code, Vistavision footage, or Academy footage (by accessing "ruler units" on the View menu, Table I). The different ruler formats are illustrated in FIG. 8.

The ruler 78 also provides a way of visualizing the partitions of a job. A job can be divided into a set of partitions, where each partition represents a subsequence of the job. Each partition has its own flow graph (see FIG. 4), thereby enabling each partition to be treated (composited) differently. The first partition in FIG. 8, for example, consists of frames 1–4. The left and right boundaries of a partition are respectively, marked by a right-pointing symbol 80a and a left-pointing symbol 80b. Partitions are sequentially numbered (starting from 1); a partition number appears half-way in between its end-markers in a number box 82. All jobs contain at least one partition (covering the entire length of the job).

A partition is selected by clicking SELECT on its number box 82 or on its shaft 84. Only one partition can be selected at a time. A selected partition can be deselected by clicking ADJUST on it, or by clicking SELECT outside it, or by selecting another partition. The flow graph of a partition can be viewed by double-clicking its partition number using SELECT (or by using the Flow Graph command in the TOOLS menu, Table I). The user can alter the boundaries of a partition by dragging(using SELECT) its end-markers to the left or the right. Partition boundaries are always aligned with frame boundaries. Holding the control key down while dragging a partition marker causes it to be replicated to a new position (i.e., divides the partition into two subpartitions). A partition marker can be removed by dragging it out of the ruler. After each insertion or deletion of a marker, the partitions are automatically renumbered. The first and the last partition markers can neither be deleted nor moved.

As shown in FIG. 3, a palette 86 of four tools appears above the sequence ruler. A tool is chosen by clicking SELECT on it, in which case the cursor changes to the shape of that tool. The relevance of the tools is as follows:

The pointer tool 88a is the default tool and is used for all the activities described earlier (e.g., selection);

The diamond tool 88b is used for creating new partition markers;

The key tool 88c is used for marking keyframes; and

The comment tool 88d is used for attaching arbitrary comments to frames.

More particularly, after selecting the diamond tool 88b, the user can click SELECT on the ruler to insert a pair of markers at that position. The effect is that the clicked partition is divided into two subpartitions. A keyframe, which is marked by the key tool 88c, is a frame of special interest used, for example, to decide the appropriate color grading parameters. An element may have any number of key frames. In the present interface, key frames are used as a means of signaling to the user the important frames. To mark key frames, the user first selects the key tool 88c and then clicks SELECT inside a frame (this can be a frame from any element). If the frame is not already a keyframe, then it becomes one and a key symbol appears above it (such as the symbol 89 in FIG. 3). Key symbols can also be attached to ruler slots by clicking SELECT on the ruler. The comment tool 88d can be used as a way of documenting and conveying information related to the special effect being created. To do this, the user first selects the tool and then clicks SELECT inside a frame (this can be a frame from any element). If the frame has no comment, then a comment symbol appears above it. The comment attached to a frame can be edited by double-clicking its symbol using SELECT, causing a pop-up comment block (not shown) to appear.

By selection of the appropriate tool from the TOOLS menu (Table I), the operations outlined in the flow-graph 42 may be obtained and viewed either for a column of frames (the "composite column" command) or for a partition (the "composite partition" command). The flow-graph can be operated at reduced resolutions to speed up interaction. For example, to quickly arrive at the structure of an effect for a key frame, it is not necessary to process the images at full resolution. The flow-graph allows this initial work to be executed at reduced resolution, for example, at one-sixteenth resolution. The parameters for processes such as color-grading and blue-screen compositing can be interactively adjusted with results appearing on the screen more rapidly than when in high resolution. Once the desired effect is achieved, high resolution is selected and the final composite can be seen at full resolution. Finally, after a key-frame has been successfully composited at high-resolution, the "open-loop composite" command (TOOLS menu, Table I) can be invoked to automatically process subsequent frames. A motion preview capability further allows the composited sequence to be transferred to and viewed from the digital video disk recorder 34 (FIG. 2).

Figure 9:
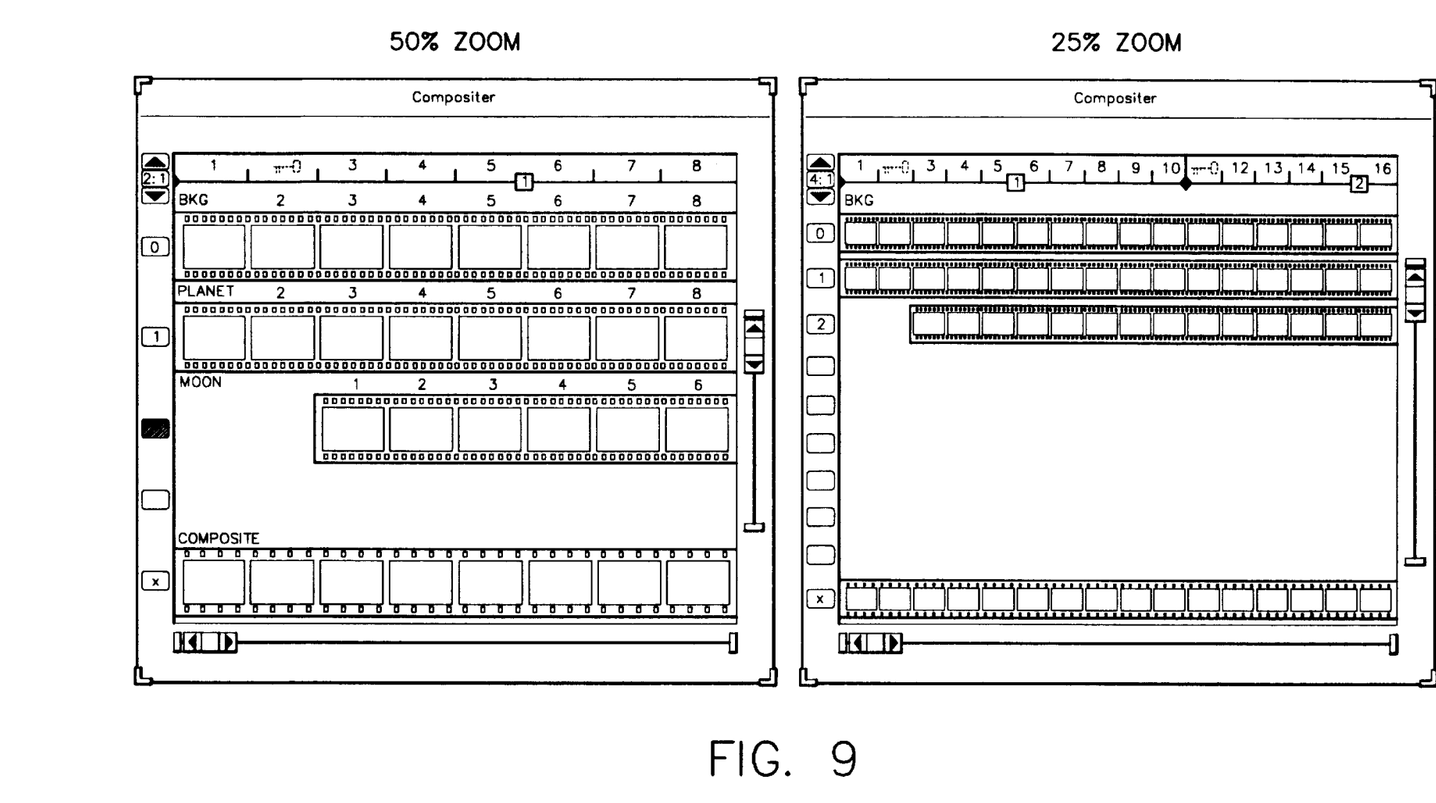
FIG. 9 shows the change in the appearance of the compositer window for several zoom levels.
Figure 10:
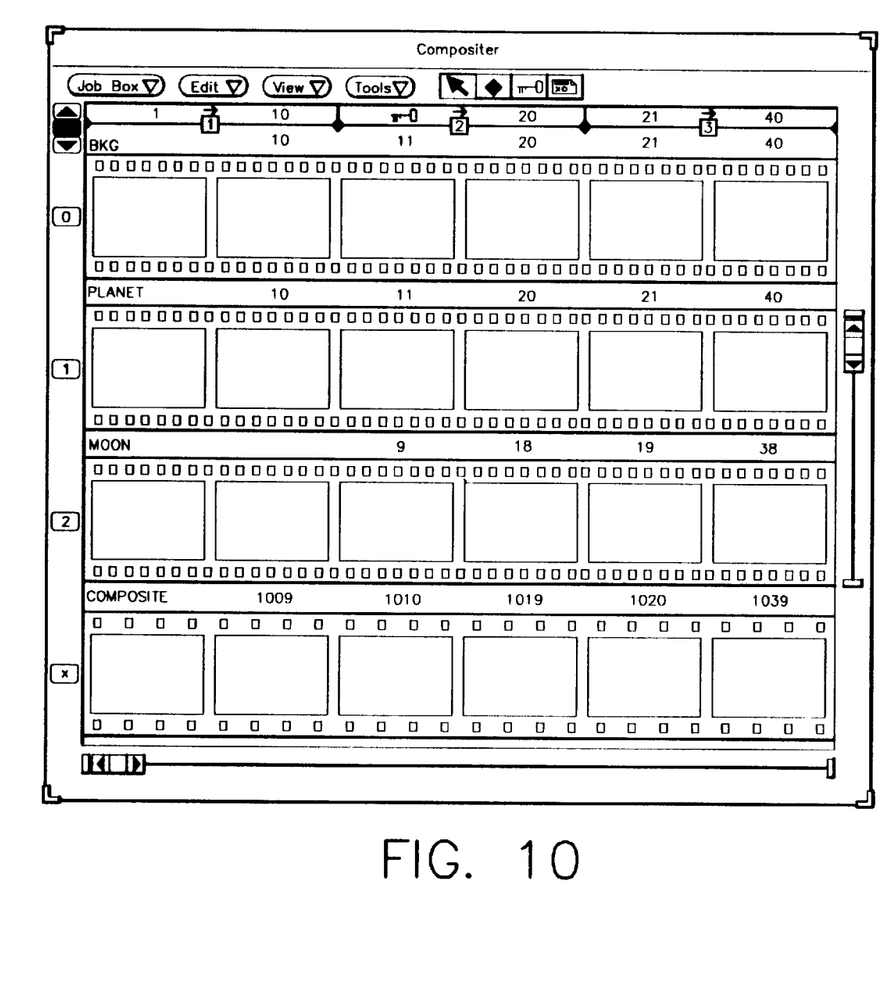
FIG. 10 shows the condense mode of operating the compositer window.

The elements in a job can be viewed at a number of zoom levels (e.g., 1:1=100%, 2:1=50%, and 4:1=25%). To zoom out, the user clicks SELECT in a down icon 90a to the extreme left of the ruler. Similarly, to zoom in, the user clicks in an up icon 90b. Alternatively, the "zoom" selection may be made from the VIEW menu (Table I). The zoom level is displayed between the two icons. Each zoom in or out changes the display scale by a factor of 2. FIG. 9 shows the window appearance at 50%, and 25% zoom levels. Frame "postage stamp" images are also displayed at these zoom levels (but not shown in FIG. 9). All functionality remains the same, except that at 25% zoom frame numbers above the elements and symbols are permanently hidden. Clicking on the zoom ratio 90c (between the two zoom arrows) causes it to be highlighted and changes the display of the film strips to the condense mode. In the condense mode, only the first and the last frame of each partition is shown; thus each element can be completely visualized without the need to scroll through the complete element (this is especially useful for a job with long elements). The condense mode can also be accessed from the VIEW menu with the "partition" command (Table I). FIG. 10 illustrates the condense mode at 100% zoom.

Figure 11:
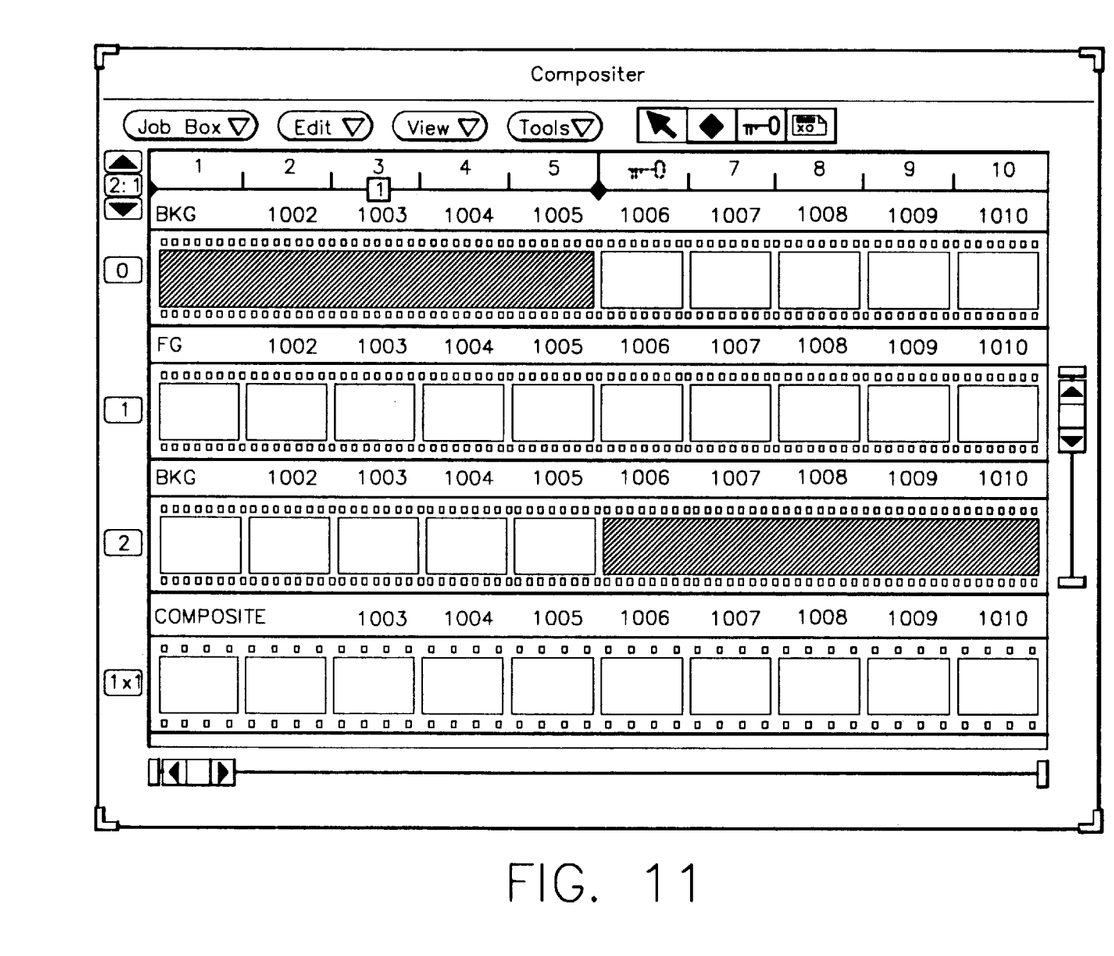
FIG. 11 is an illustration of dynamically changing the hierarchy of the image sequences of FIG. 3 by using hidden segments.

Any set of frames from an element can be hidden by the user. The effect of this operation is that the nominated frames become transparent: they do not take part in the compositing process. To hide a set of frames, the user first selects them and then choose Segment(Hide) command from the Edit menu (Table I). Hidden frames are drawn in the same color as the film base. Hidden frames can be shown again by choosing the Segment(Show) command. Hiding of frames is useful for creating dynamic cross-over hierarchies, in which the order of the elements alternate for the length of the job. For example, given two elements F1 and F2 in a job, suppose that for the first partition F1 should be in front of F2 and then for the second partition F2 should be in front of F1. To achieve this, F1 is duplicated and the copy is placed in front of F2. Then segments from F1 and its copy are selectively hidden and partitioned to obtain the reversed effect. FIG. 11 illustrates this for two elements called BKG (F1) and FG (F2).

The preceding description of the user interface constitutes a verbal, system level specification of the interface. Consequently, the interface may be programmed according to conventional practice to provide the features illustrated in the drawings and outlined in the specification. While the user interface has been designed to assist portability of the system to many different hardware platforms, this is not a critical aspect of the claimed invention. Likewise, issues of speed are of economic value but do not directly bear on the technical merits of the interface, particularly the functionality that allows most of the special effects to be carried out using just two windows, namely, the composter window 40 and the flow graph window 42.

The composter interface is implemented, in the preferred embodiment, in C++, an object-oriented language described in *The C++ Programming Language,* by B. Stroustrup, Addison-Wesley, Reading, Mass., 1986. The interface is run on a SUN SparcStation running UNIX, X-Window/Xview (see *The X Window System,* O'Reilly & Associates, Vols.

0–7, Sebastapol, Calif., 1990). For its image display capabilities, the workstation uses a Tech Source frame buffer (GDS-3900 Series Graphics Display Processor Board, TechSource Inc. Altamonte Springs, Fla.) with a 24-bit RGB plane and an overlay 8-bit plane for windowing.

While not essential for practice of the claimed invention, the workstation employs a multi-layer software architecture. The layers provide isolation between the outer user interface layers and the inner hardware dependent layers. This layering allows flexibility in porting the software to varied hardware platforms. The workstation will, therefore, have the same look and feel whether it runs on a high performance accelerated machine or on a lower cost workstation. This flexibility also allows new developments in hardware technology to be adopted rapidly. The user interface layer is written using the object oriented language C++ and makes use of the industry-standard graphical user interface, OpenLook. This layer gathers the user's intent and converts it into a request stream called the Motion-picture Interface Protocol or MIP. Screen design and workflow management are therefore contained within the user interface layer. In the preferred embodiment, the user interface is modelled on film optical concepts but the architecture will permit different user interface personalities to be accommodated, e.g., computer graphics, or video.

In the preferred embodiment, the user interface attaches to the image processing layer via an MIP server. The server takes the stream of MIP requests from one or a number of user interfaces and performs the required image processing functions. The image processing layer is written in C++ and performs largely a resource management role. The layer converts the requests to a stream of low level calls on the hardware layer. These calls are part of a library called the Image Processing Application Programming Interface, or IP-API.

The invention has been described in detail with particular reference to a presently preferred embodiment, but it will be understood that variations and modifications can be effected within the spirit and scope of the invention.

What is claimed is:

1. A user interface system for electronically arranging the components of a special effects job for a motion picture production from a plurality of image sequences obtained by the scanning of motion picture film, said system comprising:
   a) a virtual light box interface for lining up the components of the special effects job, said virtual light box interface comprising:
      means for ordering a plurality of image sequences into background and foreground image sequences, each sequence being composed of frames that imitate the frames of a motion picture film;
      means for displaying the image sequences adjacent to each other so that the frames thereof visually align on a frame-to-frame basis; and
      means providing for user variation of the adjacency of the image sequences so that different frames thereof are brought into visual alignment with each other, such that the image sequences are ordered by the user as to adjacency for one or more special effects; and
   b) a flow graph interface visually displaying the type and order of special effects-process operations applied to the frames, said flow graph interface providing for user specification and control of what operations are to be performed and in what order the operations are applied to the components of the special effects job.

2. A system as claimed in claim 1 wherein said virtual light box interface includes an additional image sequence with additional frames, and wherein said ordering means includes ordering the additional image sequence into a hierarchy of background, foreground, and additional image sequences, the additional frames forming an image sequence in which a special effect is displayed.

3. A system as claimed in claim 2 wherein said image sequences include a background sequence and a plurality of foreground sequences ordered into a hierarchy that illustrates a special effects priority of the foreground sequences, said means providing for user variation of the adjacency of the image sequences also providing for user variation of the hierarchy of the foreground image sequences so that the priority of the foreground sequences can be changed by the user.

4. A system as claimed in claim 1 further including means for partitioning the background and foreground sequences into a plurality of image partitions each being designated for a respective special effect.

5. A system as claimed in claim 4 wherein said displaying means only displays the first and last frame of each image partition.

6. A system as claimed in claim 1 wherein said image sequences are displayed via said virtual light box interface in a window in a windowing environment.

7. A system as claimed in claim 6 wherein said displaying means is operable in a plurality of zoom modes, each mode displaying a different number of frames of each image sequence within the window.

8. A user interface system for electronically arranging the components of a special effects job for a motion picture production from a plurality of image sequences obtained by the scanning of motion picture film, said system comprising:
   means for ordering a plurality of image sequences into a hierarchy of background and foreground image sequences, each sequence being composed of frames that imitate the frames of a motion picture film;
   means for displaying the hierarchical image sequences adjacent to each other so that the frames thereof visually align on a frame-to-frame basis;
   means providing for user variation of the adjacency of the image sequences so that different frames thereof are brought into visual alignment with each other, whereby the image sequences are ordered by the user for a special effect;
   means for generating and displaying an additional image sequence with additional frames, wherein said ordering means includes means for ordering the additional image sequence into a hierarchy of background, foreground, and additional image sequences, and the additional frames form an image sequence in which the special effect is displayed; and
   means providing for user specification and control and visual display of the type and order of special effects operations applied to each frame of the background and foreground image sequences.

9. A system as claimed in claim 8 wherein said image sequences include a background sequence and a plurality of foreground sequences ordered into a hierarchy that illustrates a special effects priority of the foreground sequences, said adjacency varying means further including means for user variation of the hierarchical arrangement of the image sequences so that the illustrated priority of the foreground sequences can be changed by the user.

10. A system as claimed in claim 8 further including means for partitioning the background and foreground sequences into a plurality of image partitions each being designated for a respective special effect.

11. A system as claimed in claim 8 wherein said means providing for user specification and control and visual display includes means for interactively establishing and displaying a flow diagram having interconnected special effects-process icons.

12. An interface method for electronically visualizing a special effects job for a motion picture production from a plurality of image sequences obtained by the scanning of motion picture film, said method comprising the steps of:

a) lining up the image sequences into components of the special effects job, the lining up step comprising:

ordering a plurality of image sequences into a hierarchy of background and two or more foreground image sequences, each sequence being composed of frames that imitate the frames of a motion picture film;

displaying the hierarchical image sequences adjacent to each other so that the frames thereof visually align on a frame-to-frame basis;

user variation of the adjacency of the image sequences so that different frames thereof are brought into visual alignment with each other, whereby the image sequences are ordered by a user as to adjacency for a special effect; and displaying an additional image sequence representative of the special effect for the ordered image sequences; and b) user specifying and visual displaying of the type and order of special effects-process operations applied to the frames, thereby showing what operations are to be performed and in what order the operations are to be applied to the components of the special effects job.

13. An interface method as claimed in claim 12 further including the step of partitioning the background and foreground sequences into a plurality of image segments each being designated for a special effect.

14. An interface method as claimed in claim 12 further including the step of providing for user changing of the hierarchical arrangement of the foreground image sequences relative to the background image sequence, whereby the image sequences are ordered by the user as to hierarchy for a special effect.

* * * * *